(12) United States Patent
Kim et al.

(10) Patent No.: US 6,344,532 B1
(45) Date of Patent: Feb. 5, 2002

(54) METHOD OF PREPARING VINYL CHLORIDE RESIN HAVING HIGH IMPACT STRENGTH AND LOW DIE SWELL

(75) Inventors: Kyung-Hyun Kim; Hyun-Deuk Kim; Kyung-Woo Lee, all of Yochon (KR)

(73) Assignee: LG Chemical Ltd. (KR)

( * ) Notice: Subject to any disclaimer, the term of this patent is extended or adjusted under 35 U.S.C. 154(b) by 0 days.

(21) Appl. No.: 09/600,529

(22) PCT Filed: Apr. 27, 1999

(86) PCT No.: PCT/KR99/00200

§ 371 Date: Jul. 18, 2000

§ 102(e) Date: Jul. 18, 2000

(87) PCT Pub. No.: WO00/31156

PCT Pub. Date: Jun. 2, 2000

(30) Foreign Application Priority Data

Apr. 20, 1998 (KR) ............................................. 98/49911

(51) Int. Cl.⁷ .................................................. C08F 2/00
(52) U.S. Cl. ....................................................... 526/344
(58) Field of Search ........................ 526/89, 201, 194, 526/344; 525/579

(56) References Cited

U.S. PATENT DOCUMENTS 4,381,361 A    4/1983  Hardt et al.
6,232,412 B1 *  5/2001  Raspanti ...................... 526/74

FOREIGN PATENT DOCUMENTS

DE            3524302          1/1987

* cited by examiner

Primary Examiner—Christopher Henderson
(74) Attorney, Agent, or Firm—Baker Botts LLP

(57) ABSTRACT

A method of preparing vinyl chloride resin is provided. In the method, a first vinyl chloride monomer is mixed with a first initiator to prepare a seed polymer particle and a second vinyl chloride monomer and a second initiator are added to the polymerized seed polymer particle. An organic siloxane polymer is added to the first monomer and/or second monomer of Formula (1), wherein $R_1$ is hydrocarbon having 1 to 12 carbon atoms and substituted with a group selected from the group consisting of hydrogen, alkyl, haloalkyl, aryl, haloaryl, aralkyl, polyether, imino, epoxy and vinyl; $R_2$ is saturated hydrocarbon having 1 to 12 carbon atoms; and n is an integer of 10 to 12,000.

8 Claims, No Drawings

METHOD OF PREPARING VINYL CHLORIDE RESIN HAVING HIGH IMPACT STRENGTH AND LOW DIE SWELL

CROSS-REFERENCES TO RELATED APPLICATIONS

This application is based on application No. 98-49911 filed in the Korean Industrial Property Office on Nov. 20, 1998, the content of which is incorporated hereinto by reference.

BACKGROUND OF THE INVENTION (a) Field of the Invention

The present invention relates to a method of preparing vinyl chloride resin, and more particularly, to a method of preparing vinyl chloride resin having excellent impact strength and processibility.

(b) Description of the Related Art

Poly(vinyl chloride), abbreviately PVC, is a commodity plastic which is widely used because of its excellent properties and resistance to other chemicals. Still more it is possible to achieve widely performance from flexible to rigid by formulating with various additives. Owing to these advantages, the PVC is used for profile, pipe, tube, electric wire, flooring material and, interior and exterior building materials and industrial use also. But as the PVC is very rigid and brittle, the final products can be easily broken and must be toughened to make it useful applications. Furthermore, the PVC resin is extruded, PVC has a large swell problem. It makes difficult to fabricate accurate products for satisfying the highly dimensional stability and precision such as thin layer or complicated shaped product. Therefore, there has been extensive work to change the weakness of the PVC-Poor impact strength and large die swell.

For improving poor impact strength of PVC, early works suggest the method of using rubbery materials having low glass transition temperature (Tg) with PVC resin formulation like as nitrile rubber or butadiene rubber, chlorinated polyethylene.

Generally, the rubber impact modifiers are prepared by graft-copolymerization with rubber particle core (prepared by emulsion polymerizing butadiene or acrylate rubber and having particle diameter 100 to 500 nm) having good impact strength an comonomer such as methylmethacrylate or styrene having good compatibility with vinyl chloride resin.

For improving the impact strength, it is very important to disperse uniformly impact modifiers previously mentioned like as core-shell structured rubber impact modifier or chlorinate polyethylene.

Chlorinated polyethylene or rubber impact modifier shows a good dispersion ability to the PVC resin, improving impact strength of PVC resin but deteriorating weatherability and transparency. Furthermore, because the rubber impact modifier is generally made by emulsion polymerization process and acquired latex coagulation method, it should be repeatedly dispersed in the vinyl chloride resin. So the rubber impact modifier's uniform dispersion in PVC resin is generally very difficult.

For improving these disadvantages, polyolefinic (ethylene-vinyl acetate copolymer) rubber is un-situ graft copolymerized with a vinyl chloride monomer to thereby improve PVC impact resistance. However, the obtained vinyl chloride resin is difficult to fabricate into various forms.

A method for improving impact strength of vinyl chloride resin discloses U.S. Pat. No. 3,969,431. In the method, vinyl chloride or vinyl chloride mixture is suspension polymerized with one or more comonomers in the presence of butyl acrylate rubber or 2-ethylhexyl acrylate rubber impact modifier latex essentially crosslinked elastomer particles to thereby improve impact strength. However, as the impact modifier latex contains the unreacted residual emulsifier, the polymerization step is unstable and the final molded product used to show severely discoloring problem.

Alternatively, a method that a monomer with a very low glass transition temperature is copolymerized with the vinyl chloride resin, or vinyl chloride polymerization is performed by using the monomer, is disclosed in Japanese Patent Laid-open Sho. 60-255813. In this method, acrylic esters are copolymerized with vinyl chloride, or vinyl chloride is suspension polymerized in the presence of acrylic ester polymer. However, due to increases of acrylic ester contents in the polymer, formability, dynamic heat stability and flexural modulus decrease and the discoloration severely occurs.

For reducing die swell of the vinyl chloride resin, an excess amount of lubricants is added to the PVC resin formulation. However, the added lubricant has a poor compatibility to the vinyl resin, migrating to the surface of the molded product. Due to the reason, the external shape of the molded product is deteriorated and the lubricant is accumulated a mold, causing plate-put which results in product contamination and default.

SUMMARY OF THE INVENTION

It is all object of the present invention to provide a method of preparing vinyl chloride resin having a good impact strength and a lower die swell without deterioration of another properties In order to achieve this object and others, the present invention provides a method of preparing vinyl chloride resin having a good impact strength including the 2 steps mass polymerization method. In this method, a first polymerization step is to prepare seed particle for a second polymerization step mixing a first vinyl chloride monomer with a first initiator to thereby prepare a first polymer; and adding a second vinyl chloride monomer, a second initiator and a organic siloxane polymer having the formula 1.

Alternatively, in the present invention, the organic siloxane polymer may be used in the first step rather than the second step.

[Formula 1]

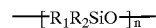

(wherein $R_1$ is hydrocarbon having 1 to 12 carbon atoms and substituted with a group selected from the group consisting of hydrogen, alkyl, haloalkyl, aryl, haloaryl, aralkyl, polyether, fluorine, imino, epoxy and vinyl;

$R_2$ is saturated hydrocarbon having 1 to 12 carbon atoms; and n is an integer of 10 to 2,000)

DETAILED DESCRIPTION OF THE INVENTION

The vinyl chloride resin of the present invention includes polymers having at least 60 weight percent of vinyl chloride monomer. The polymer includes only a vinyl chloride monomer or copolymer of the vinyl chloride monomer and other copolymerizable monomer. The copolymerizable monomer may be capable of copolymerizing with the vinyl chloride monomer and the exemplary of the monomer may be vinyl ethers; acrylates containing unsaturated double bond, epoxy or hydroxy, methacrylates; olefins such as ethylene and propylene, unsaturated aliphatic acids containing carboxylic group, such as acrylic acid, methacrylic acid, itacone acid, maleic acid and anhydride thereof.

The exemplary of the vinyl ethers may be methyl vinyl ether, ethyl vinyl ether, vinyl ether containing aliphatic compounds having carbon atoms of 12 or less. The monomer having unsaturated double bond may be ethyl acrylate, ethyl methacrylate, normal-propyl acrylate, normal-propyl methacylate, iso-propyl acrylate, iso-propyl methacrylate, secondary-butyl acrylate, secondary-butyl methacrylate, isobutyl acrylate, isobutyl methacrylate, 2-ethylhexyl acrylate, 2-ethylhexyl acrylate, lauryl acrylate, lauryl methacrylate, stearyl acrylate, stearyl methacrylate or alpha-metylstyrene. Furthermore, the monomer including epoxy group may be glysidyl acrylate, glysidyl methacrylate. The monomer including carboxyl group may be acrylic acid, methacrylic acid, itaconic acid, fumaric acid or maleic acid. The monomer including hydroxy group may be 2-hydroxy ethyl acrylate, 2-hydroxy ethyl methacrylate, 2-hydroxy propyl acrylate, 2-hydroxy propyl methyacrylate, 2-hydroxy butyl acrylate or 2-hydroxy butyl methacrylate.

The present invention provides a method of preparing vinyl chloride resin. In the method, a first initiator is fed into a first polymerization reactor and the pressure is reduced. A vinyl chloride monomer is added to the reactor and the temperature increases at predetermined polymerization temperature. In this case, a first polymerization occurs. Other copolymerizable monomer may be added to the reactor.

When the conversion from monomer to polymer reaches to 10 to 12% by keeping at the increased temperature, the reactant in the first reactor is transferred to a second polymerization reactor. If the first polymerization step is performed to obtain reactant with the conversion of below 10%, vinyl chloride resin manufacturing process is unstable and it is difficult to form particles. On the contrary, if the polymerization is performed to obtain the reactant with the conversion exceeding 12%, no additional advantages is not taken.

A second vinyl chloride monomer, a second initiator and an organic siloxane polymer having formula 1 are added the second polymerization reactor. The amount of the organic siloxane polymer is 0.01 to 20 weight percent. If the amount of the siloxane polymer is below 0.01 weight percent, effects by the addition of siloxane polymer, for example, formability and impact strength improvement, do not satisfy. On the contrary, if the amount exceeds 20 weight percent, compatible of the organic siloxane polymer with vinyl chloride decreases, resulting in poor external appearance.

[Formula 1]

(wherein $R_1$ is hydrocarbon having 1 to 12 carbon atoms and substituted with a group selected from the group consisting of hydrogen, alkyl, haloalkyl, aryl, haloaryl, aralkyl, polyether, fluorine, imino, epoxy and vinyl;

$R_2$ is saturated hydrocarbon having 1 to 12 carbon atoms; and n is an integer of 10 to 2,000)

The viscosity of the organic siloxane is 20 to 100,000 Cst. If the viscosity is below the above range, extrusion property is improved, but impact strength is very slightly improved. On the contrary, the viscosity exceeds the above range, impact strength is largely improved, but extrusion property is deteriorated.

The temperature of the second polymerization reactor increases at predetermined polymerization temperature to occur a second polymerization. When the conversion from monomer to polymer reaches to 60 to 70%, unreacted vinyl chloride is removed and the polymerization terminates to thereby obtain vinyl chloride resin.

In the method, the organic siloxane polymer may be both added to the first and second reactor, or only the first reactor without addition to the second reactor.

The polymerization temperature controls polymerization degree of the vinyl chloride resin and greatly influences on the condition and characteristics of final product. Therefore, it is important to select the suitable polymerization temperature. In the present invention, the first and second polymerization are performed at the conventional polymerization temperature, for example, 30 to 80° C.

As the initiator, organic peroxides may be used. The exemplary of the organic peroxides includes peroxides such as di-pentyperoxide, di-3,5,5,-trimethyl hexa-noylperoxide and dilauroyl peroxide; peroxicarbonates such as diisopropylperoxycarbonate, di-secondarybutylperoxydicarbonate, di-2-ethylhexylperoxycarbonate and 2-ethylhexylperoxycarbonate; peroxy ester such as t-butyl peroxy pivalate, t-butylperoxyneodecarbonate, azo compound such as azobisisobutyronitrile, azobis-2-methylbutyronitrile, azobis-2,4-dimethylvaleronitrile; sulfate such as potassium sulfate and ammonium persulfate.

The amount of the initiator depends on various manufacturing conditions such as manufacturing process, productivity and quality. The initiator amount is 0.8 to 1.5 weight percent of total monomer. If the amount is below the above range, the reaction time is longer and productivity is reduced. On the contrary, if the amount exceeds the above range, the unreacted initiator is remained in the final resin, resulting in deterioration of heat stability, color and quality of the resin.

The exemplary of the organic siloxane polymer includes at least one A: polymer or copolymer of dimethyl siloxane, methyl chlorinated phenyl siloxane, methyl hydrogen siloxane, amono-modified siloxane, epoxy modified siloxane, octamethyl cyclotetra siloxane, decamethyl cyclopenta siloxane, dodecamethyl cyclohexasilane, trimethyl triphenyl cyclotrisilane, dimetyl siloxane and 3-mercaptopropylmethyl siloxane; B: copolymer of dimetyl siloxane, vinyl dimethoxy silane; C: copolymer of 3-mercaptopropylmetyl siloxane, dimethyl siloxame and vinyl methyl dimethoxy silane; D: copolymer of dimethyl siloxane and tetra vinyl tetra methyl cyclosiloxane; and E: copolymer of organic siloxane and 30 to 80 wt % of acrylic ester.

The exemplary of acrylic ester used in the copolymer of organic siloxane and acrylic ester includes one or more methylacrylate, methylmethacrylate, ethylacrylate, ethylmethacrylate, butylacrylate, butylmethacrylate, 2-ethyl hexyl acrylate, 2-ethylhexylmethacrylate.

The obtained vinyl chloride resin of the present invention by bulk polymerizing has improved extrusion formability and impact strength.

The present invention is further explained in more detail with reference to the following examples which are the scope of this invention.

EXAMPLE 1

120 g of 2-ethylhexyl peroxy dicarbonate, 5 kg of polydimethylsiloxane with 1,000 Cst of viscosity were fed to a first reactor and the reactor was evacuated and then 300 kg of vinyl chloride was fed to the first reactor and the temperature was elevated to 64° C. At this time, a first polymerization occurred. When the conversion from monomer to polymer reached to 10 percent, the resulting reactant was transferred to a second reactor. 400 kg of vinyl chloride and 100 g of 2-ethyl hexyl peroxy dicarbonate and 80 g of dilauroyl peroxide were fed to and the temperature was kept at 58° C. At this time a second polymerization occurred and final vinyl chloride resin particles were prepared. When the conversion from monomer to polymer reached to 65%, the unreacted vinyl chloride was removed and the polymerization was terminated to thereby produce a vinyl chloride resin powder.

EXAMPLE 2

120 g of 2-ethyl hexyl peroxy dicarbonate was fed to a first reactor and the reactor was evacuated. 300 kg of vinyl chloride was fed to the first reactor and the temperature was elevated to 64° C. and kept at 64° C. At this time, a first polymerization occurred. When a conversion from monomer to polymer reached to 10%, the first reactant was transferred to a second reactor. 400 kg of vinyl chloride, 100 g of 2-ethylhexyl peroxy dicarbonate, 80 g of dilauroyl peroxide and 5 kg of polydimethylsiloxane with viscosity of 1,000 Cst were fed into the second polymer and the temperature was kept at 58° C. At this time, a second polymerization occurred. When the conversion from monomer to polymer reached to 65%, the unreacted vinyl chloride was removed and the polymerization was terminated. As a result, the vinyl chloride powder was prepared.

EXAMPLE 3

120 g of 2-ethylhexyl peroxy dicarbonate and 2 kg of polydimethylsiloxane with viscosity of 5,000 Cst were fed to a first reactor and a pressure was reduced. 300 kg of vinyl chloride was fed to the first reactor and the temperature was elevated to 64° C. and kept. At this time, a first polymerization occurred. When the conversion from monomer to polymer reached to 10%, the reactant in the first reactor was transferred to a second reactor. 400 kg of vinyl chloride, 100 g of 2-ethylhexyl peroxyl dicarbonate, 80 g of dilauroyl peroxide, 5 kg of copolymer of dimethylsiloxane with viscosity of 50 Cst and butylmethacrylate in the weight ratio of 60:40 were fed to the second reactor. The temperature in the second reactor was kept at 58° C. to thereby polymerize. When the conversion from monomer to polymer reached to 65%, the unreacted vinyl chloride was removed and the polymerization was terminated. As the result, a vinyl chloride resin powder was prepared.

EXAMPLE 4

120 g of 2-ethylhexyl peroxy dicarbonate was fed to a first reactor and a pressure was reduced. 300 kg of vinyl chloride was fed to the first reactor and the temperature was elevated to 64° C. and kept. At this time, a first polymerization occurred. When the conversion from monomer to polymer reached to 10%, the reactant in the first reactor was transferred to a second reactor. 400 kg of vinyl chloride, 100 g of 2-ethylhexyl peroxy dicarbonate, 80 g of dilauroyl peroxide, 3 kg of 3-mercaptopropylmethyl siloxane with viscosity of 50 Cst were fed to the second reactor. The temperature was kept at 58° C. to thereby polymerize. When the conversion from monomer to polymer reached to 65%, the unreacted vinyl chloride was removed and the polymerization was terminated. As the result, a vinyl chloride resin powder was prepared.

EXAMPLE 5

120 g of 2-ethylhexyl peroxy dicarbonate was fed to a first reactor and a pressure was reduced. 300 kg of vinyl chloride was fed to the first reactor and the temperature was elevated to 64° C. and kept. As this time, a first polymerization occurred. When a conversion from monomer to polymer reached to 10%, the reactant in the first reactor was transferred to a second reactor. 400 kg of vinyl chloride, 100 g of 2-ethylhexyl peroxy dicarbonate, 80 g of dilauroyl peroxide, 1 kg of 3-mercaptopropylmethyl siloxane with viscosity of 50 Cst and 2 kg of polydimetyl siloxane with viscosity of 2000 Cst were fed to the second reactor. The temperature was kept at 58° C. to thereby polymerize. When the conversion from monomer to polymer reached to 65%, the unreacted vinyl chloride was removed and the polymerization was terminated. As the result, a vinyl chloride resin powder was prepared.

EXAMPLE 6

A vinyl chloride resin powder was prepared by the same procedure in Example 2 except that polydimethylsiloxane with viscosity of 500 Cst was used instead of polydimethiylsiloxane with viscosity of 1000 Cst.

EXAMPLE 7

A vinyl chloride resin powder was prepared by the same procedure in Example 2 except that polydimethysiloxane with viscosity of 5,000 Cst was used instead of polydimethylsiloxane with viscosity of 1000 Cst.

EXAMPLE 8

A vinyl chloride resin powder was prepared by the same procedure in Example 3 except that a copolymer of methysiloxane with viscosity of 5,000 Cst and vinyldimetyl dimethoxy silane was used.

COMPARATIVE EXAMPLE 1

3 kg of 4% of an aqueous solution of polyvinyl alcohol having viscosity of 32 cps and 80 mole percent of hydroxy group, 120 g of 2-ethylhexy peroxy dicarbonate, 100 g of dilauroyl peroxide, 400 kg of deionized water were fed to a reactor. The pressure was reduced and 380 kg of vinyl chloride was fed to the reactor. Thereafter, the mixture was shaken for 10 minutes and the temperature in the reactor was elevated at 58° C. and kept. At this time, suspension polymerization occurred. When the pressure in the reactor was dropped up by 10% to pressure at initial polymerization, the polymerization was terminated. The unreacted vinyl chloride was recovered and water was removed from the reactant. As the result, a vinyl chloride powder was prepared.

COMPARATIVE EXAMPLE 2

120 g of 2-ethylhexy peroxy dicarbonate was fed to a first reactor and pressure was evacuated. 300 kg of vinyl chloride was fed to the first reactor and the temperature was elevated to 64° C. and kept. At this time, polymerization occurred. When the conversion from monomer to polymer reached to 10%, the reactant in the first reactor was transferred to a second reactor. 400 kg of vinyl chloride, 100 g of 2-ethylhexyl peroxy dicarbonate and 80 g of dilauroyl peroxide were fed to the second reactor. The temperature was kept at 58° C. to thereby polymerize. When the conversion from monomer to polymer reached to 65%, the unreacted vinyl chloride was recovered and the polymerization was terminated. As the result, a vinyl chloride resin was prepared.

COMPARATIVE EXAMPLE 3

3 kg of 4% of an aqueous solution of polyvinyl alcohol having viscosity of 32 cps and 80 mole percent of hydroxy group, 120 g of 2-ethylhexy peroxy dicarbonate, 100 g of dilauroyl peroxide, 400 kg of deionized water and 1.5 kg of a copolymer of dimethylsiloxane with viscosity of 50 Cst and butylmethacrylate in the weight ratio of 60:40 were fed at one time to a reactor. The pressure was reduced and 380 kg of vinyl chloride was fed to the reactor. Thereafter, the mixture was shaken for 10 minutes and the temperature in the reactor was elevated at 58° C. and kept. At this time, suspension polymerization occurred. When the pressure in the reactor was dropped up by 10% to an initial polymerization pressure, the polymerization was terminated. The unreacted vinyl chloride was recovered and water was removed from the reactant. As the result, a vinyl chloride powder was prepared.

COMPARATIVE EXAMPLE 4

3 kg of 4% of an aqueous solution of polyvinyl alcohol having viscosity of 32 cps and 80 mole percent of hydroxy group, 120 g of 2-ethylhexy peroxy dicarbonate, 100 g of dilauroyl peroxide, 400 kg of deionized water and 1.5 kg of 3-mercaptopropylmethylsiloxane with viscosity of 50 Cst were fed at one time to a reactor. The reactor was evacuated and 380 kg of vinyl chloride was fed to the reactor. Thereafter, the mixture was shaken for 10 minutes and the temperature in the reactor was elevated at 58° C. and kept. At this time, suspension polymerization occurred. When the pressure in the reactor was dropped up by 10% to an initial polymerization pressure, the polymerization was terminated. The unreacted vinyl chloride was recovered and water was removed from the reactant. As the result, a vinyl chloride powder was prepared.

The physical properties of the vinyl chloride resins of examples 1–8 and comparative examples 1–4 were determined by the following method.

1. Impact Strength Determination 100 parts by weight of vinyl chloride of examples and comparative examples, 1.5 parts by weight of tin maleate, 2.0 parts by weight of epoxydized soybean oil (hereinafter, referred to "ESO") epoxy stabilizer and 0.5 parts by weight of processing additives were mixed. As a impact modifier, methyl methacrylate-butadiene-styrene resin was added to the mixture. The amount of impact modifier shows in Table 1. The resin was press-processed with roll-milled at 170° C. for 8 minutes to thereby prepare a sample of 5 mm of thickness. The izod impact strength was determined by using a izod impact strength tester according to ASTM.

1. The Die Swell Determination

1) Formulation of Vinyl Chloride Resin Composition

In a 20 liter of blender, 100 parts by weight of vinyl chloride resin of examples 1–8 and comparative examples 1–4, 70 parts by weight of dioctyl phthalate, 0.3 parts by weight of ESO as a epoxy stabilizer, 4 parts by weight of methylmethacrylate resin, 3 parts by weight of Ca/Zn-based stabilizer and mixed at 100° C. for 30 minutes 2) Preparation of Pellet for Extrusion Pellets having fine particles were prepared by using 50 mm single extruder with 22 of length/diameter.

3) Extrusion and Die Swell Determination

The pellets were extruded at 150° C. and a extrude speed of 2, 5 and 10 g/min, respectively. While the pellet was passed through a capillary of 1.0×10 mm, the diameter change thereof were determined by laser light.

3. Heat Stability 100 parts by weight of vinyl chloride resin of examples and comparative examples, 40 parts by weight of diocty phthalate and 2 parts by weight of Ba/Zn-based stabilizer were mixed. The mixture was rolled at 150° C. to thereby prepare a sheet. The time at which ignition of sheet starts, was determined in an gear oven at 200° C.

The die swell, impact strength and heat stability are shown in Table 1. In table 1, MBS indicates methyl methacrylate-butadiene-styrene, resin and phr (percent per hundred) means the part by weight of MBS based on 100 parts by weight of vinyl chloride resin.

TABLE 1

| | Apparent viscosity [g/cc] | Polymerization degree | Average particle size [μm] | Void percent [%] | Heat stability [min] | Die swell [mm] Extrusion speed [g/min] | | | Impact strength Kg · cm/cm$^2$] MSB amount [phr] | | | |
|---|---|---|---|---|---|---|---|---|---|---|---|---|
| | | | | | | 2 | 5 | 10 | 0 | 5 | 6 | 7 |
| Example 1 | 0.553 | 1000 | 140 | 29.5 | 60 | 1.02 | 1.06 | 1.1 | 16.4 | 25.1 | 111.1 | 134.7 |
| Example 2 | 0.555 | 1000 | 137 | 29.2 | 62 | 10.2 | 1.04 | 1.07 | 17.2 | 28.3 | 115.3 | 131.1 |
| Example 3 | 0.552 | 1010 | 142 | 29.1 | 60 | 1.01 | 1.03 | 1.07 | 18.3 | 28 | 110.1 | 130.5 |
| Example 4 | 0.559 | 1000 | 144 | 29 | 57 | 1.05 | 1.08 | 1.13 | 17.2 | 28.7 | 98.5 | 124.4 |
| Example 5 | 0.551 | 1000 | 135 | 29 | 62 | 1.01 | 1.03 | 1.03 | 16 | 25 | 109 | 130 |
| Example 6 | 0.557 | 995 | 138 | 28.8 | 62 | 1.04 | 1.07 | 1.07 | 16.4 | 27.7 | 109.2 | 126.6 |
| Example 7 | 0.561 | 1000 | 136 | 28.1 | 63 | 1.02 | 1.03 | 1.03 | 16.6 | 27.9 | 105.2 | 128.2 |
| Example 8 | 0.563 | 1010 | 137 | 28.4 | 57 | 1.05 | 1.08 | 1.08 | 17.8 | 28.1 | 112.3 | 130 |
| Comparative example 1 | 0.578 | 1000 | 143 | 27.3 | 60 | 1.14 | 1.17 | 1.22 | 12 | 23 | 35 | 103 |
| Comparative example 2 | 0.555 | 1000 | 145 | 28 | 56 | 1.11 | 1.14 | 1.18 | 11 | 19 | 28 | 100 |
| Comparative example 3 | 0.556 | 1000 | 143 | 27.5 | 53 | 1.04 | 1.08 | 1.13 | 16.5 | 27.6 | 96.4 | 115.7 |
| Comparative example 4 | 0.547 | 1000 | 144 | 27.4 | 54 | 1.05 | 1.08 | 1.15 | 17.3 | 26.5 | 103 | 120.2 |

As shown in Table 1, the vinyl chloride resin of the present invention has excellent heat stability when compared with that of comparative example. Furthermore, the vinyl chloride resin of the present invention has smaller die swell ratio than that of comparative example. Particularly, although the extruding speed elevates, the die swell ratio was very slightly increased. Furthermore, the vinyl chloride resin of the present invention has excellent impact strength, when compared with that of comparative example.

As described above, the vinyl chloride resin has excellent heat stability and impact strength and very small die swell ratio.

What is claimed is:

1. A method of preparing vinyl chloride resin having good impact strength comprising the steps of:

mixing a first vinyl chloride monomer with a first initiator to prepare a seed polymer particle;

adding a second vinyl chloride monomer, a second initiator and an organic siloxane polymer to the polymerized seed polymer particle

[Formula 1]

wherein $R_1$ is hydrocarbon having 1 to 12 carbon atoms and substituted with a group selected from the group consisting of hydrogen, alkyl, haloalkyl, aryl, haloaryl, aralkyl, polyether, imino, epoxy and vinyl;

$R_2$ is saturated hydrocarbon having 1 to 12 carbon atoms; and n is an integer of 10 to 12,000.

2. The method of claim 1 wherein the organic siloxane polymer has 20 to 100,000 Cst of viscosity.

3. The method of claim 1 wherein the amount of organic siloxane polymer is 0.01 to 20 weight percent.

4. The method of claim 1 wherein the first polymer further includes organic siloxane polymer.

5. A method of preparing vinyl chloride resin having good impact strength comprising the steps of:

mixing a first vinyl chloride, a first initiator and an organic siloxane polymer of formula 1 to prepare a first polymer;

adding a second vinyl chloride and a second intiator to the first polymer

[Formula 1]

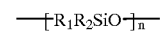

wherein R1 is hydrocarbon having 1 to 12 carbon atoms and substituted with a group selected from the group consisting of hydrogen, alkyl, haloalkyl, aryl, haloaryl, aralkyl, polyether, imino, epoxy and vinyl;

$R_2$ is saturated hydrocarbon having 1 to 12 carbon atoms; and n is an integer of 10 to 12,000.

6. The method of claim 5 wherein the organic siloxane polymer has 20 to 100,000 Cst of viscosity.

7. The method of claim 5 wherein the amount of organic siloxane polymer is 0.01 to 20 weight percent.

8. The method of claim 5 wherein the second polymerization step further includes organic siloxane polymer.

* * * * *

UNITED STATES PATENT AND TRADEMARK OFFICE
CERTIFICATE OF CORRECTION

| | |
|---|---|
| PATENT NO. | : 6,344,532 B1 |
| DATED | : February 5, 2002 |
| INVENTOR(S) | : Kyung-Hyun Kim, Hyun-Deuk Kim and Kyung-Woo Lee |

It is certified that error appears in the above-identified patent and that said Letters Patent is hereby corrected as shown below:

<u>Title page,</u>
Item [30], Foreign Application Priority Data, "Apr. 20, 1998" should read
-- Nov. 20, 1998 --

Signed and Sealed this

Fifteenth Day of October, 2002

*Attest:*

JAMES E. ROGAN
*Director of the United States Patent and Trademark Office*

*Attesting Officer*